United States Patent Office 2,918,352
Patented Dec. 22, 1959

2,918,352
PREPARATION OF DIBORANE

Frank A. Kanda and Aden J. King, Syracuse, and Charles C. Clark, Kenmore, N.Y., assignors, by mesne assignments, to Olin Mathieson Chemical Corporation, a corporation of Virginia No Drawing. Application November 20, 1956
Serial No. 623,506

1 Claim. (Cl. 23—204)

This invention relates to the preparation of boron hydrides and, more particularly, provides a method for the production of diborane and related volatile and non-volatile boron hydrides.

The boron hydrides do not occur in nature but many of them have successfully been prepared. Diborane, tetraborane, two pentaboranes and decaborane are among the better known boron hydrides. Some of these materials and their organic derivatives are useful as fuels due to their high heats of oxidation. Diborane is useful for conversion to the higher boron hydrides and has been used to produce thin films of pure elementary boron by thermal decomposition of the hydrides on a hot surface. Diborane is useful and other hydrides are also useful for the synthesis of metal borohydrides and metal borides. The boron hydrides are extremely powerful reducing agents. They react with Lewis bases such as ammonia, amines and pyridine and are thus useful starting materials for the preparation of boron-nitrogen compounds, for example, borazin, $B_3N_3H_6$ and many other compounds.

The process of the present invention comprises the process of heating a reduced form of boron in admixture with elementary sulfur in an atmosphere of hydrogen suitably at atmospheric pressure. Elementary boron, boron carbides and metallic borides can be utilized as the reduced form of boron. Among the metal borides which are useful are $CaB_6$, $MnB$, $MnB_2$, $BaB_6$, $Ni_2B$, $NiB_2$, $MgB_2$, $MgB_4$, $Co_2B$, $CoB_2$, $CoB$, $AlB_2$, $AlB_{12}$, $Cu_3B_2$, $CrB$, $Cr_3B_2$, $SiB_3$, $SiB_6$, $WB_2$, $Mo_3B_4$ and $TiB$.

An intimate mixture of the reduced form of boron and elementary sulfur is prepared by mixing the finely powdered components. Preferably the mixture is compressed into homogeneous pellets or slugs, and preferably in the mixture there is from 1 to 50 gram atoms of boron per gram atom of elementary sulfur. In addition to the reduced form of boron and the elementary sulfur, hydrogen gas is supplied to the reaction. The hydrogen requires no special purification, commercial hydrogen as supplied in cylinders under pressure being satisfactory.

The reaction is carried out by heating a suitable mixture of the reduced form of boron and elementary sulfur to a temperature of from 700° C. to 1800° C. in an atmosphere of hydrogen. The necessary heat can be supplied in any suitable manner. A particularly advantageous method is by electrical induction. For this purpose an electrically conductive material is provided to support or surround the reaction mixture and is arranged for the introduction of hydrogen gas and removal of the gaseous products. A vertical graphite tube of suitable diameter, water-jacketed at one end and arranged to support the reaction mixture at the other, has been utilized satisfactorily. The graphite tube is surrounded by a fused silica jacket which, in turn, is jacketed and water-cooled. Hydrogen gas is introduced into the water cooled end of the graphite tube, contacting the reaction mixture and then passing into an ordinary glass system for collection of the products. The outer jacket is surrounded by the turns of an induction coil, suitably supplied with high-frequency current.

The diborane product is separated from unreacted hydrogen and other products of the reaction suitably by condensation at low temperatures. The residual hydrogen is suitable for recycle to the reaction zone.

The principal gaseous product of the reaction is diborane but small proportions of other boron hydrides may be obtained under some conditions as liquids or solids. These are readily removed in a cool zone before condensing the diborane product from the gas.

Example I

A vycor (fused silica) tube about 1¼ inches in diameter and 8 inches long was arranged vertically with an exit at the top for the gaseous products of the reaction. Inserted into the fused silica tube from the bottom was a graphite cylinder ending about 2 inches below the top of the fused silica tube and extending below it. The graphite cylinder had an external diameter of about ¾ inch and an internal diameter of about ½ inch and a wall thickness of ⅛ inch. It was retained in place by a stopper at the bottom and the extended part of the graphite carried a brass water cooling jacket. A tantalum plate about 2 inches below the top of the graphite cylinder and arranged inside the graphite cylinder supported the solid mixture charged to the reaction. The silica tube was surrounded by a water jacket. At the level of the tantalum liner the water jacket was surrounded by an induction heater comprising several turns of heavy copper tubing about ¼ inch in external diameter and cooled internally by a stream of water. The resistance heater was supplied by a high frequency current. The tantalum support was charged with a mixture composed of 4.08 grams of calcium boride and 0.2 gram of elementary sulfur. The mixture was heated to a temperature of 1050° C. while a stream of hydrogen amounting to about 2 liters per minute was passed through the apparatus for a period of one-half hour. The gaseous products leaving the reactor were collected in a trap which was cooled with liquid nitrogen and the material collected in the trap was analyzed by means of infra-red. 0.3 mg. of diborane were collected.

Example II

A mixture of 0.5 grams of elementary sulfur and 0.3 gram of elementary boron was heated at 1000° C. in a stream of hydrogen as described in Example I. Some sulfur distilled out during the reaction. A persistent green flame was obtained upon burning the exit gases.

We claim:

A method for the preparation of diborane which comprises reacting calcium boride with elementary sulfur in a hydrogen atmosphere at a temperature of from 700° C. to 1800° C., and recovering diborane from the reaction mixture.

References Cited in the file of this patent

Mellor: "Comprehensive Treatise on Inorganic and Theoretical Chemistry," vol. 5, pages 14, 15, 144 (1924), Longmans, Green & Co.

Walters et al.: Report No. MSA-9973-FR, written by W. H. Schechter, December 1, 1950, pages 8, 9, declassified May 11, 1954, Mine Safety Appliances Co., Callery, Pa.